US010003429B2

(12) United States Patent
Tsuzuki

(10) Patent No.: US 10,003,429 B2
(45) Date of Patent: Jun. 19, 2018

(54) OPTICAL TRANSMISSION DEVICE THAT TRANSMITS WAVELENGTH DIVISION MULTIPLEXED OPTICAL SIGNAL AND OPTICAL TRANSMISSION SYSTEM

(71) Applicant: FUJITSU LIMITED, Kawasaki-shi, Kanagawa (JP)

(72) Inventor: Tatsuya Tsuzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/062,726

(22) Filed: Mar. 7, 2016

(65) Prior Publication Data

US 2016/0315729 A1 Oct. 27, 2016

(30) Foreign Application Priority Data

Apr. 23, 2015 (JP) .................................. 2015-088611

(51) Int. Cl.
H04J 14/02 (2006.01)
H04B 10/08 (2006.01)
(Continued)

(52) U.S. Cl.
CPC .... H04J 14/0221 (2013.01); H04B 10/07955 (2013.01); H04B 10/294 (2013.01);
(Continued)

(58) Field of Classification Search
CPC .............. H04J 14/0221; H04J 14/0212; H04J 14/0201; H04J 14/02; H04B 10/07955; H04B 10/294; G02B 6/293; G02B 6/2938
(Continued)

(56) References Cited

U.S. PATENT DOCUMENTS 7,912,370 B2 * 3/2011 Nakamura ....... H04B 10/07955
398/177
8,275,269 B2 * 9/2012 Onaka ................. H01S 3/06758
359/334
(Continued)

FOREIGN PATENT DOCUMENTS

JP 2008-91995 4/2008
JP 2008-139073 6/2008

OTHER PUBLICATIONS

C. Randy Giles et al, "Modeling Erbium-Doped Fiber Amplifiers", Journal of Lightwave Technology, vol. 9, No. 2, Feb. 1991, pp. 271-283 (13 pages).
(Continued)

Primary Examiner — Ken N Vanderpuye
Assistant Examiner — Abbas H Alagheband
(74) Attorney, Agent, or Firm — Fujitsu Patent Center

(57) ABSTRACT

An optical transmission device includes: a wavelength allocation detector configured to detect wavelength allocation that indicates allocation of optical signals multiplexed in a WDM optical signal; a power adjusting unit configured to adjust powers of the optical signals multiplexed in the WDM optical signal; an optical amplifier configured to amplify the WDM optical signal output from the power adjusting unit; a power controller configured to generate a power control signal to control the power adjusting unit such that the WDM optical signal has a specified wavelength characteristic; and a correction value generator configured to generate a correction value to correct the power control signal based on the wavelength allocation. The power controller corrects the power control signal with the correction value. The power adjusting unit adjusts powers of the optical signals multiplexed in the WDM optical signal according to the corrected power control signal.

6 Claims, 17 Drawing Sheets

(51) Int. Cl.
  *H04B 10/00*    (2013.01)
  *H04B 13/02*    (2006.01)
  *H04B 10/079*   (2013.01)
  *H04B 10/294*   (2013.01)
  *G02B 6/293*    (2006.01)

(52) U.S. Cl.
  CPC .......... *H04J 14/0212* (2013.01); *G02B 6/293* (2013.01); *G02B 6/2938* (2013.01); *H04J 14/0201* (2013.01)

(58) Field of Classification Search
  USPC ................ 398/94, 123, 34, 38, 79, 83, 9, 19
  See application file for complete search history.

(56) References Cited

U.S. PATENT DOCUMENTS

| | | | | |
|---|---|---|---|---|
| 8,588,609 | B2* | 11/2013 | Hiraizumi | H04B 10/07953 398/26 |
| 8,965,202 | B2* | 2/2015 | Sone | H04B 17/00 398/25 |
| 2004/0197060 | A1* | 10/2004 | White | G02B 6/02252 385/123 |
| 2007/0166032 | A1* | 7/2007 | Frankel | H04B 10/2543 398/9 |
| 2007/0189348 | A1* | 8/2007 | Kovsh | B82Y 20/00 372/45.01 |
| 2008/0080865 | A1* | 4/2008 | Muro | H04J 14/0204 398/83 |
| 2008/0131116 | A1* | 6/2008 | Nakamura | H04B 10/07955 398/34 |
| 2010/0129081 | A1* | 5/2010 | Onaka | H01S 3/06758 398/81 |
| 2010/0226661 | A1* | 9/2010 | Hiraizumi | H04B 10/07953 398/194 |
| 2010/0296818 | A1* | 11/2010 | Zhou | H01S 3/302 398/147 |
| 2011/0033188 | A1* | 2/2011 | Elbers | H04J 14/02 398/79 |
| 2012/0148239 | A1* | 6/2012 | Mori | H04Q 11/0005 398/45 |
| 2013/0251365 | A1* | 9/2013 | Sone | H04B 17/00 398/38 |
| 2014/0112660 | A1* | 4/2014 | Al Sayeed | H04J 14/0221 398/38 |
| 2016/0094007 | A1* | 3/2016 | Okano | G02B 6/2938 359/341.3 |
| 2016/0315729 | A1* | 10/2016 | Tsuzuki | H04J 14/0221 |

OTHER PUBLICATIONS

Maxim Bolshtyansky, "Spectral Hole Burning in Erbium-Doped Fiber Amplifiers", Journal of Lightwave Technology, vol. 21, No. 4., Apr. 2003, pp. 1032-1038 (7 pages).

* cited by examiner

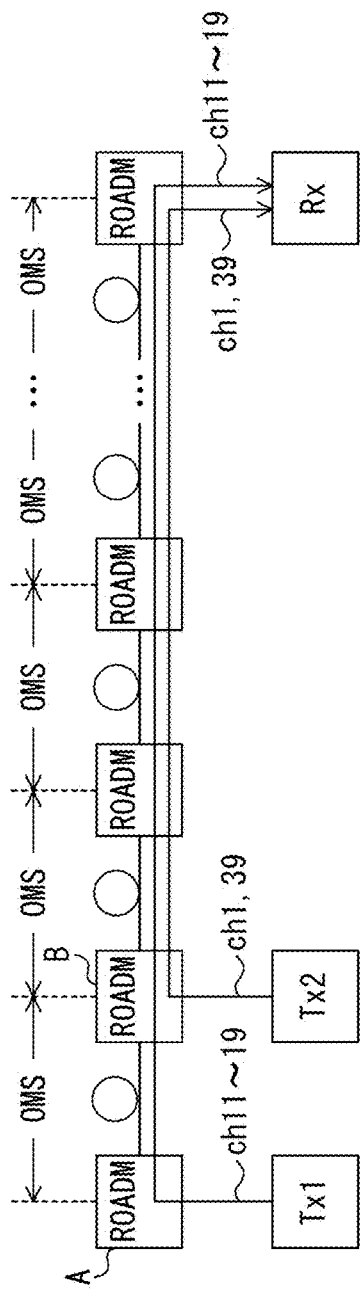
F I G. 1A
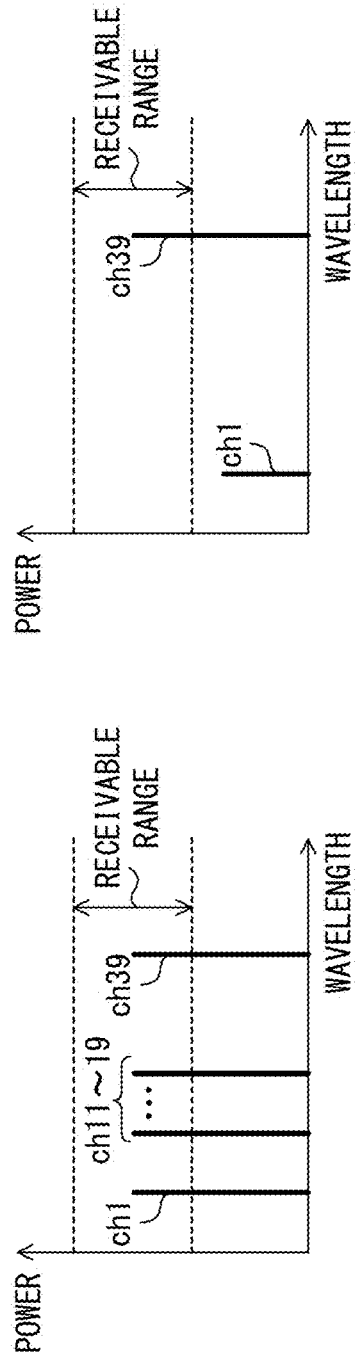
F I G. 1B
F I G. 1C

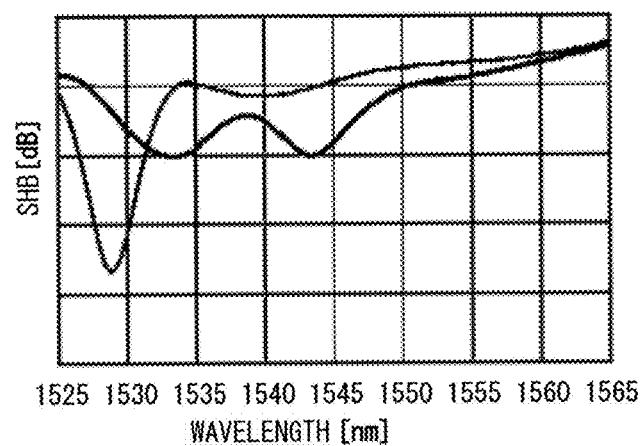
F I G. 4A
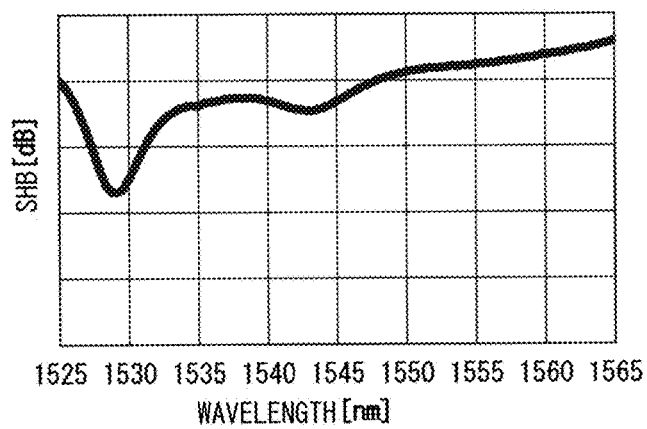
F I G. 4B
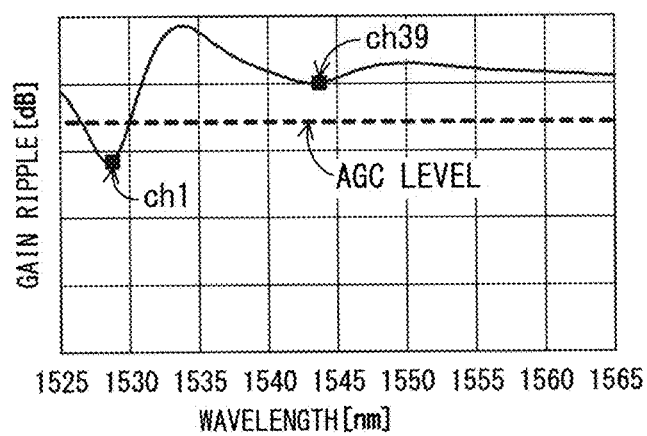
F I G. 4C

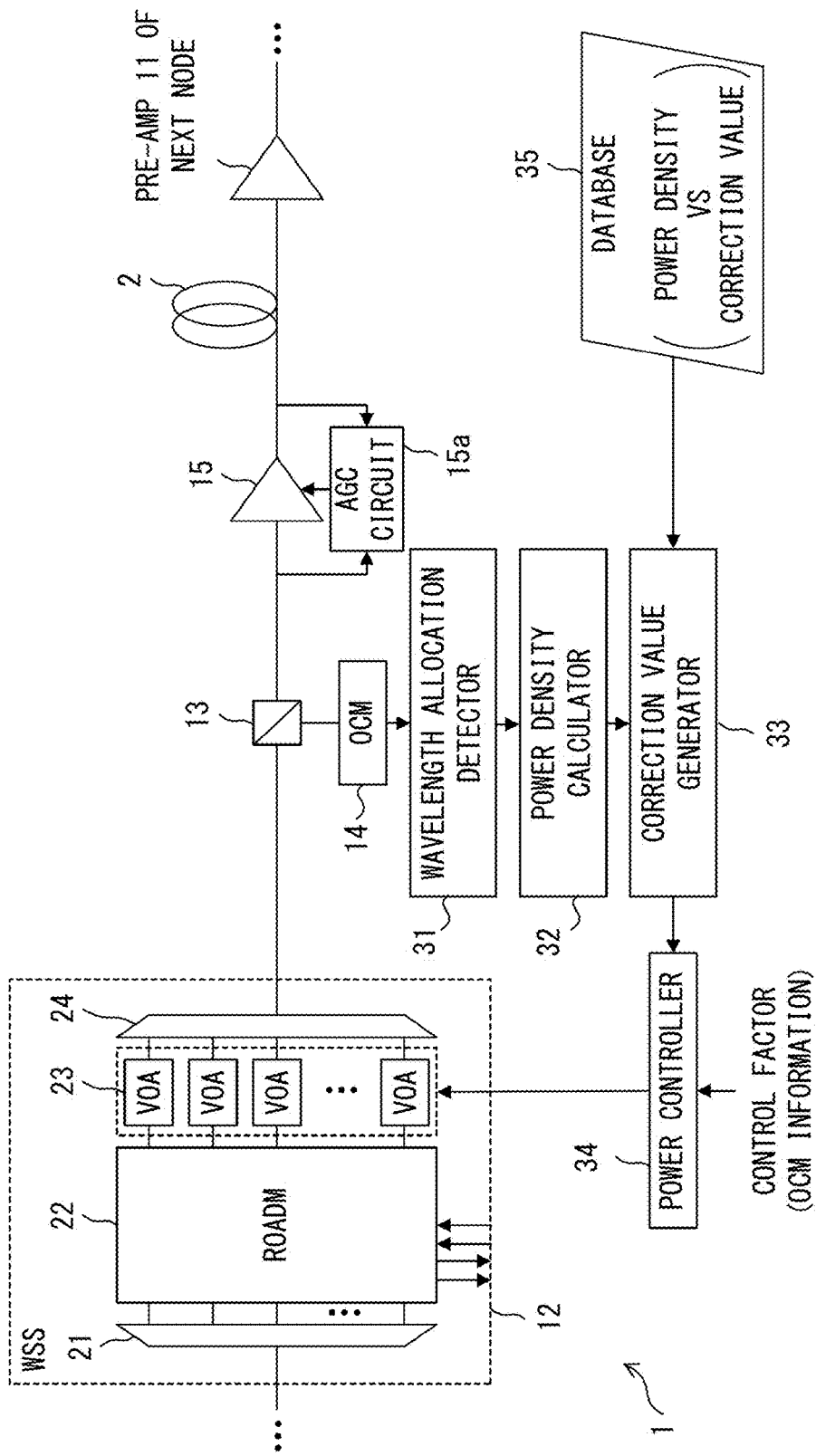
F I G. 6

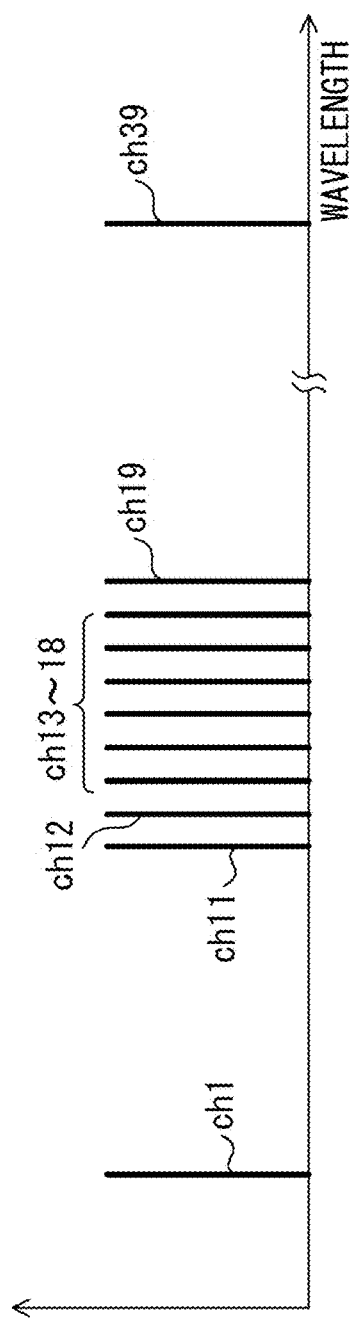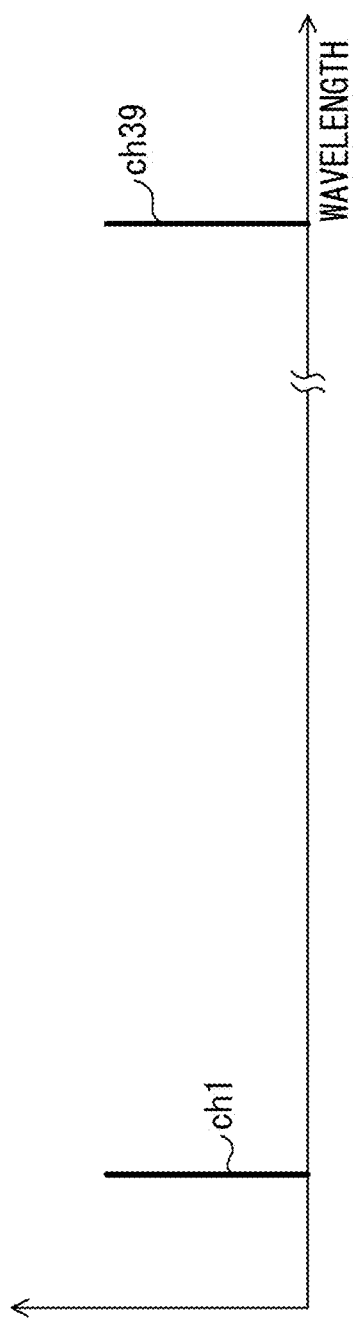

| POWER DENSITY (NUMBER OF BLANK CHANNELS) | SIGNAL POWER CORRECTION VALUE (dB) |
|---|---|
| 0 OR 1 | 0 |
| 2 | 0.9 |
| 3 | 1.5 |
| 4 | 2.0 |
| 5 | 2.4 |
| 6 | 2.7 |
| 7 | 3.0 |
| 8 | 3.25 |
| 9 OR MORE | 3.5 |

F I G. 8

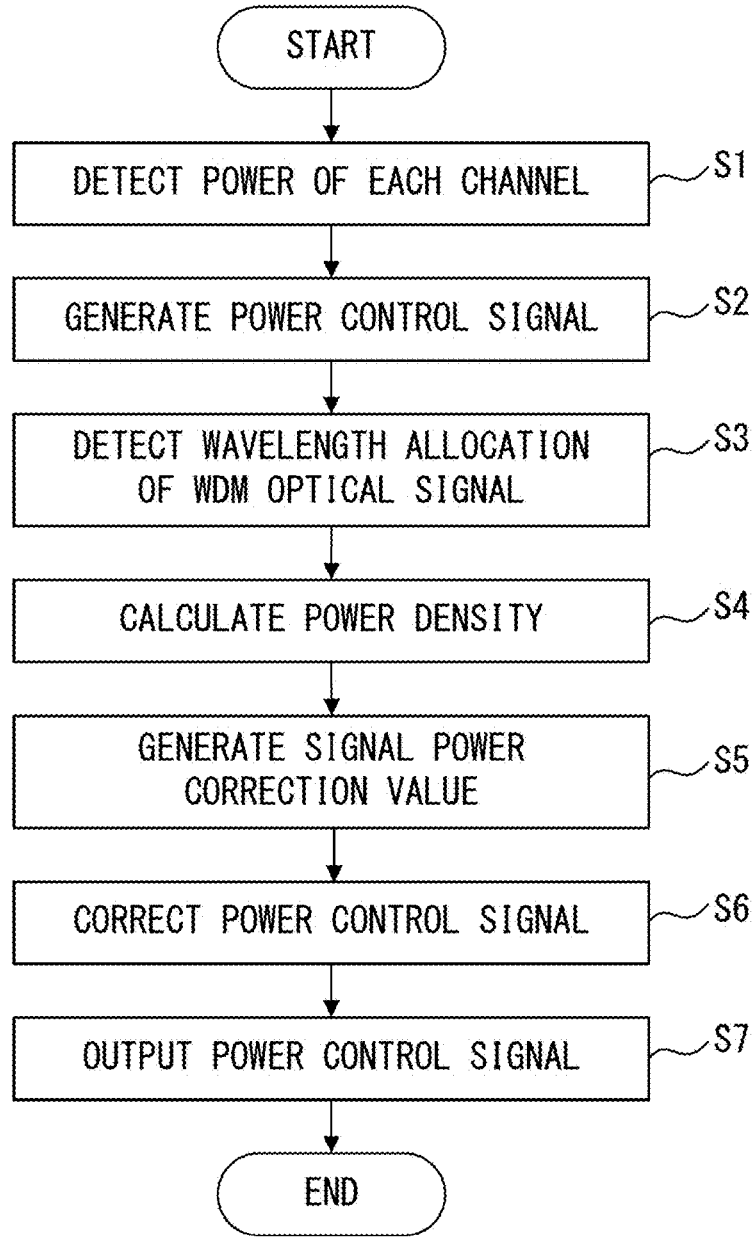
F I G. 9

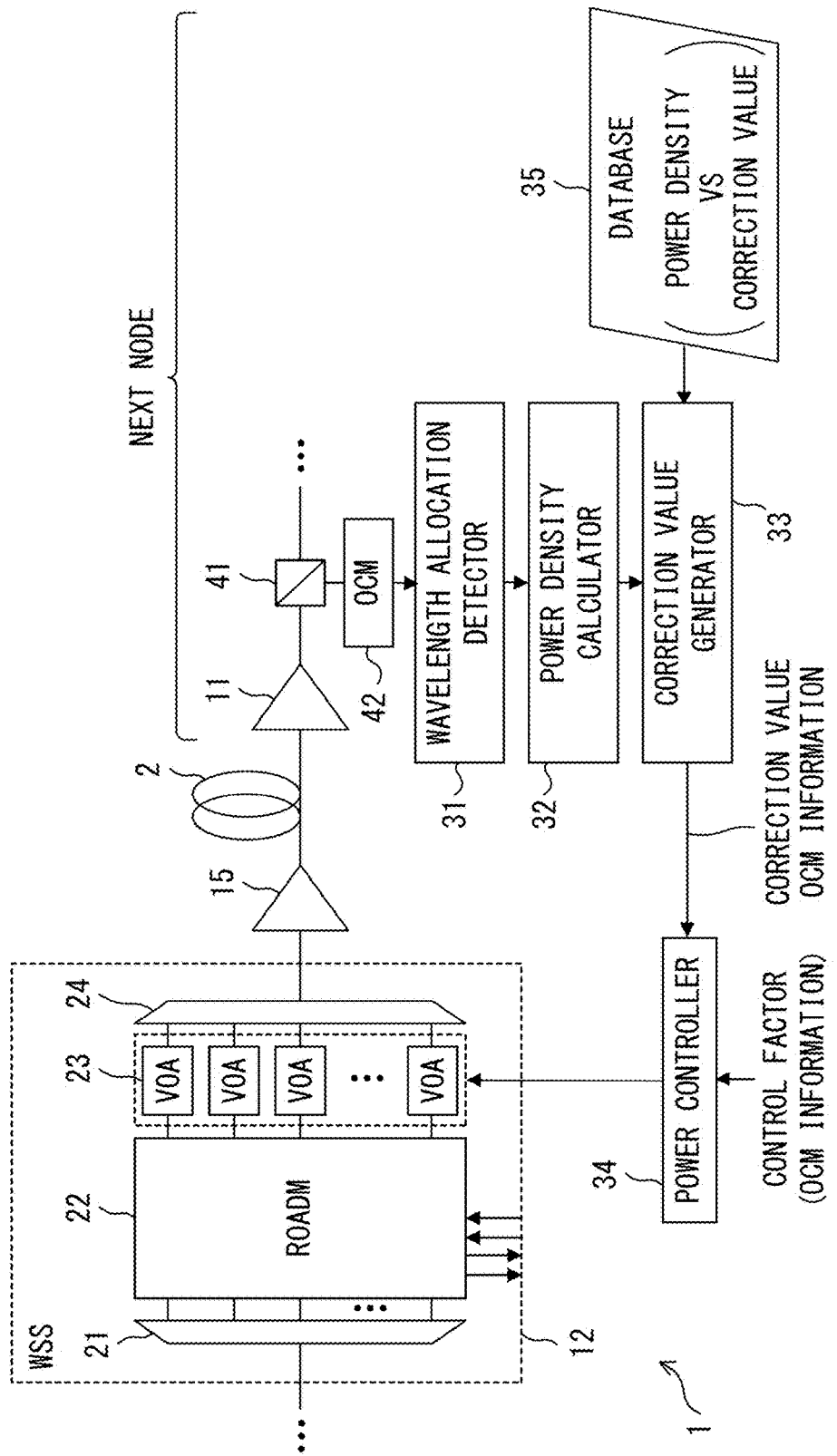
F I G. 14

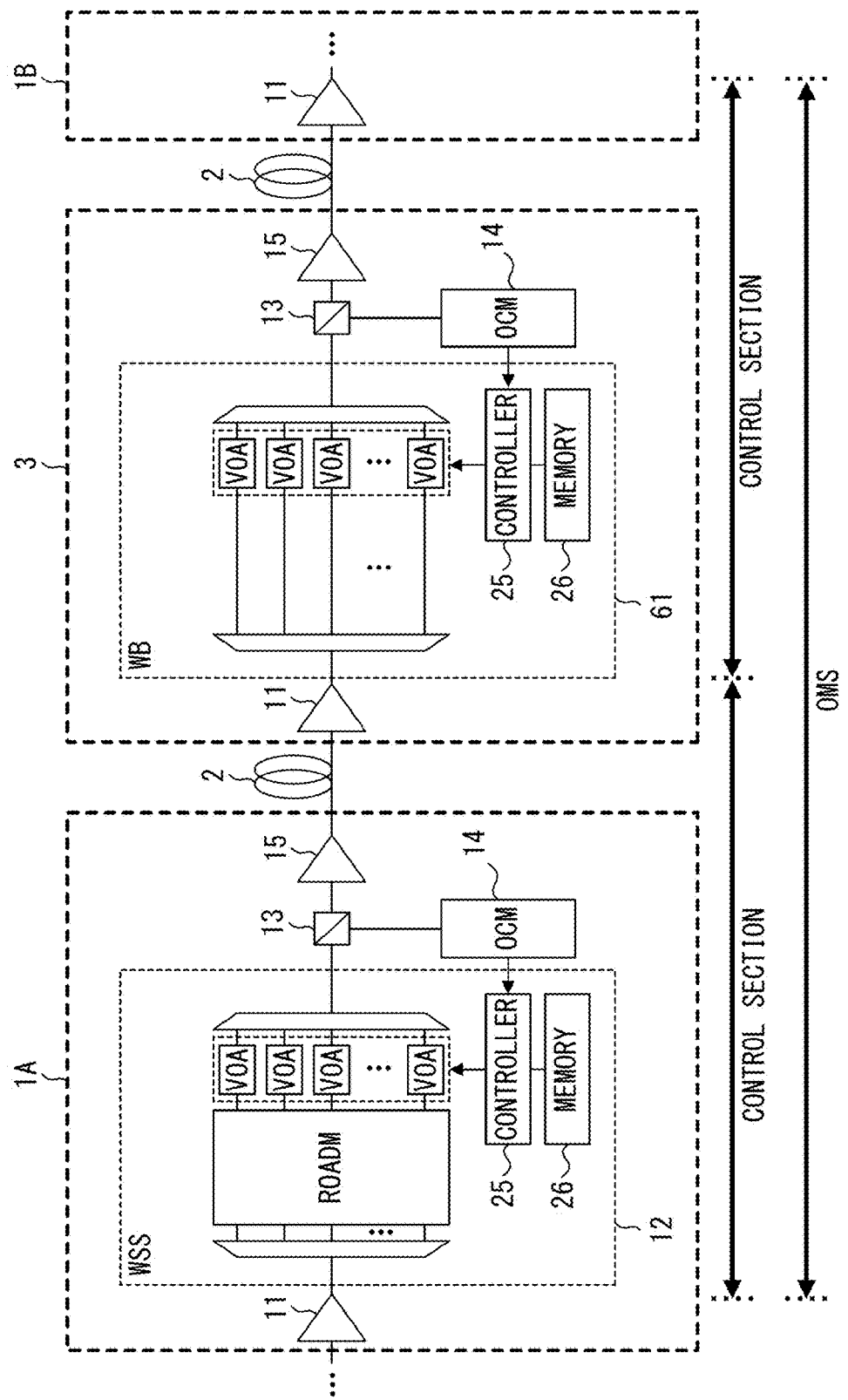
F I G. 17

OPTICAL TRANSMISSION DEVICE THAT TRANSMITS WAVELENGTH DIVISION MULTIPLEXED OPTICAL SIGNAL AND OPTICAL TRANSMISSION SYSTEM

CROSS-REFERENCE TO RELATED APPLICATION

This application is based upon and claims the benefit of priority of the prior Japanese Patent Application No. 2015-088611, filed on Apr. 23, 2015, the entire contents of which are incorporated herein by reference.

FIELD

The embodiments discussed herein are related to an optical transmission device that transmits a wavelength division multiplexed optical signal and an optical transmission system.

BACKGROUND

In recent years, WDM transmission systems, which utilize Wavelength Division Multiplexing (WDM), have been used widely. WDM can transmit a plurality of optical signals of different wavelengths. In a WDM transmission system, each node is provided with a Reconfigurable Optical Add Drop Multiplexer (ROADM). An ROADM can drop an optical signal of a desired wavelength from a WDM optical signal and also can add an optical signal to an unused channel in a WDM optical signal.

In a WDM transmission system, each node is provided with an optical amplifier in order to compensate for losses in transmission path fibers and ROADMs. As an optical amplifier for amplifying a WDM optical signal, an Erbium Doped Fiber Amplifier (EDFA) for example is used.

The wavelength characteristics of the optical gain and the optical loss regarding a WDM optical signal depend upon the wavelength allocation of the WDM optical signal. Accordingly, a WDM transmission system has a function of adjusting the optical power of each wavelength channel based on the wavelength allocation of a WDM optical signal. This function is implemented by for example an optical channel monitor (OCM), which detects the optical power of each wavelength channel, and a wavelength selective switch (WSS), which adjusts the optical power of each wavelength channel. In such a case, the optical power of each wavelength channel is controlled so that the powers of optical signals arriving at a receiving node are maintained within the receivable power range of the optical receiver.

However, it takes several hundreds of milliseconds through several seconds for an optical channel monitor to detect an optical power and/or for a wavelength selective switch to adjust the optical power. This may lead to a situation where a change in the wavelength allocation of a WDM optical signal results in temporary but large variation in the optical power of each wavelength channel. When the power of an optical signal arriving at a receiving node gets out of the receivable power range of the optical receiver, a signal error occurs.

This problem arises when a change in the wavelength allocation of a WDM optical signal causes a large change in the optical gain wavelength characteristic. In a case where gain ripples for a WDM optical signal are large in a steady state, a change in the optical gain wavelength characteristic caused by a change in the wavelength allocation of a WDM optical signal is large. In other words, if gain ripples for a WDM optical signal in a steady state can be reduced, a change in the optical gain wavelength characteristic caused by a change in the wavelength allocation of the WDM optical signal may be reduced. In such a case, even when the wavelength allocation of a WDM optical signal changes, variation in the optical power of each wavelength channel is suppressed, leading to suppression of signal errors in an optical receiver. Note that a gain ripple refers to variation in the optical gain for a wavelength.

Spectral Hole Burning (SHB) is one factor that causes a gain ripple of an EDFA. Spectral hole burning occurs when an optical signal passes through an EDFA. Specifically, when an optical signal passes through an EDFA, the gain at a wavelength of the optical signal and its adjacent wavelengths is decreased.

Thus, reduction in a gain ripple caused by spectral hole burning suppresses variation in the optical power of each wavelength channel even when the wavelength allocation of the WDM optical signal changes.

As a configuration for suppressing variation in a gain ripple, an optical transmission device that adds pseudo light to a wavelength band not used in an optical signal is proposed (Japanese Laid-open Patent Publication No. 2008-091995 for example). Also, as a related art, a method of measuring accurately the intensity of an optical signal in a WDM communication system is proposed (Japanese Laid-open Patent Publication No. 2008-139073 for example). Further, the following documents describe the modeling of an EDFA and spectral hole burning.

C. Randy Giles and Emmanuel Desurvire, Modeling Erbium-Doped Fiber Amplifiers, Journal of Lightwave Technology, Vol. 9, No. 2. 271-283 (1991)

Maxim Bolshtyansky, Spectral Hole Burning in Erbium-Doped Fiber Amplifiers, Journal of Lightwave Technology, Vol. 21, No. 4. 1032-1038 (2003)

According to conventional techniques, it is difficult to suppress efficiently a gain ripple caused by spectral hole burning. This also makes it difficult to suppress a change in a gain ripple accompanying a change in the wavelength allocation of a WDM optical signal. Note that in the method that adds pseudo light to a wavelength band not used in an optical signal, some wavelength channels in the WDM optical signal are not able to be used for data transmission.

SUMMARY

According to an aspect of the invention, an optical transmission device includes: a wavelength allocation detector configured to detect wavelength allocation that indicates allocation of optical signals multiplexed in a WDM (wavelength division multiplexed) optical signal; a power adjusting unit configured to adjust powers of the optical signals multiplexed in the WDM optical signal; an optical amplifier configured to amplify the WDM optical signal output from the power adjusting unit; a power controller configured to generate a power control signal to control the power adjusting unit such that the WDM optical signal has a specified wavelength characteristic; and a correction value generator configured to generate a correction value to correct the power control signal based on the wavelength allocation. The power controller corrects the power control signal with the correction value. The power adjusting unit adjusts powers of the optical signals multiplexed in the WDM optical signal according to the corrected power control signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A through FIG. 1C illustrate examples of a WDM transmission system and powers of received optical signals;

FIG. 3A through FIG. 4C illustrate spectral hole burning caused by a plurality of optical signals;

FIG. 6 illustrates examples of an optical transmission device and an optical transmission system according to a first embodiment;

FIG. 7A and FIG. 7B illustrate examples of wavelength allocation of a WDM optical signal;

FIG. 8 illustrates an example of a power density/correction value conversion table;

FIG. 9 is a flowchart illustrating an example of a process of a controller;

FIG. 14 illustrates an example of an optical transmission system according to a second embodiment;

FIG. 17 illustrates an example of an optical transmission system according to a fifth embodiment.

DESCRIPTION OF EMBODIMENTS

An optical transmission device and an optical transmission system according to the embodiments of the present invention suppress a gain ripple caused by spectral hole burning. Therefore, before describing the configurations or operations of the optical transmission device, brief explanations will be given for a gain ripple caused by spectral hole burning.

It is assumed in the description below that eighty eight wavelength channels (ch1 through ch88) can be multiplexed in a WDM optical signal. Note that an optical signal that is allocated to wavelength channel chx may be referred to as "optical signal chx".

As illustrated in FIG. 1A, each node is provided with a ROADM in an optical transmission system that transmits a WDM optical signal. Transmitter Tx1 transmits optical signals ch11 through ch19 to receiver Rx. Transmitter Tx2 transmits optical signals ch1 and ch39 to receiver Rx. Optical signals ch1, ch11 through ch19 and ch39 are multiplexed in a WDM optical signal.

The ROADM provided to each node can adjust the power of each optical signal multiplexed in a WDM optical signal. For example, the ROADM equalizes the powers of a plurality of optical signals that are multiplexed in a WDM optical signal. "Equalization" refers to controlling of the powers of a plurality of optical signals so that the powers of the optical signals are substantially equal or roughly equal. The ROADM is provided with an optical amplifier that amplifies a WDM optical signal. The amplifier is implemented by an EDFA in the present example. The ROADM controls the power of a WDM optical signal by using an EDFA so that the powers of optical signals received by receiver Rx are maintain within the receivable range.

Spectral hole burning occurs when an optical signal passes through an EDFA. Specifically, when an optical signal passes through an EDFA, the gain at a wavelength, and its adjacent wavelengths, of the optical signal is decreased.

Figure 2A:
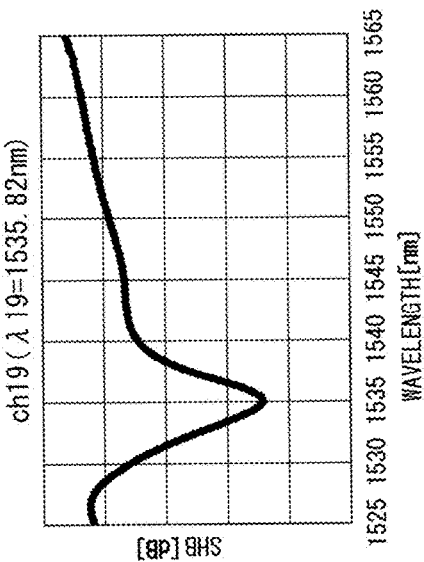
FIG. 2A through FIG. 2D illustrate characteristics of spectral hole burning caused by one optical signal.
Figure 2B:
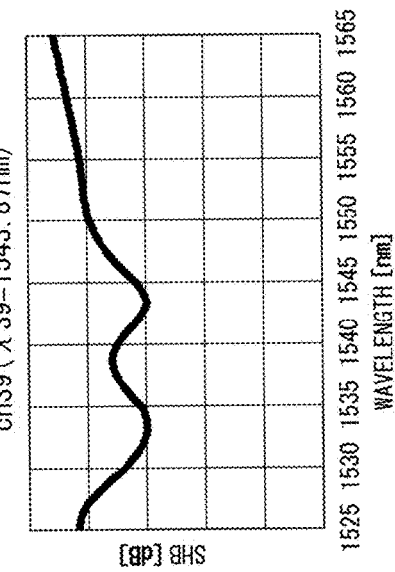
Figure 2C:
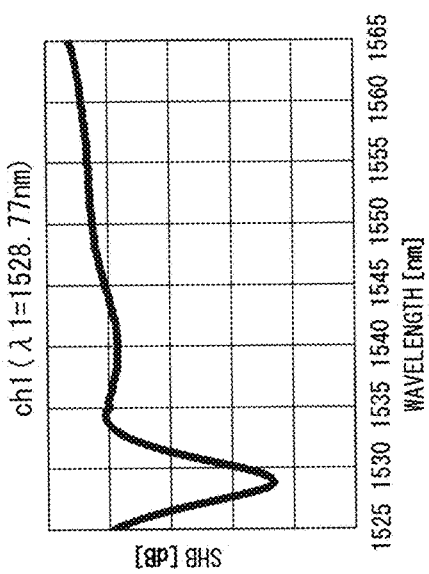
Figure 2D:
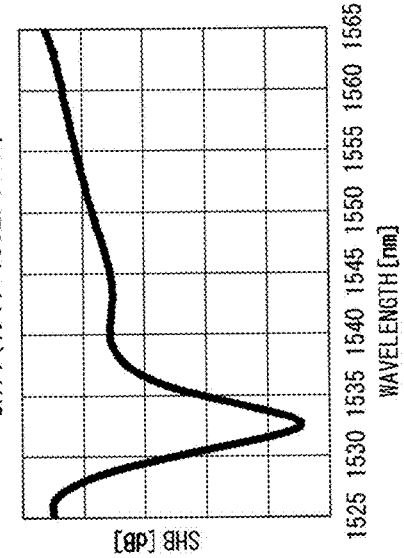

FIG. 2A through FIG. 2D represent characteristics of spectral hole burning. FIG. 2A illustrates a gain spectrum in a case when optical signal ch1 ($\lambda 1$=1528.77 nm) passes through an EDFA. When optical signal ch1 passes through an EDFA, the gain at $\lambda 1$ and its adjacent wavelength region is decreased as illustrated in FIG. 2A. Similarly, when optical signal ch11 ($\lambda 11$=1532.68 nm) passes through an EDFA, the gain at $\lambda 11$ and its adjacent wavelength region is decreased as illustrated in FIG. 2B. When optical signal ch19 ($\lambda 19$=1535.82 nm) passes through an EDFA, the gain at $\lambda 19$ and its adjacent wavelength region is decreased as illustrated in FIG. 2C. When optical signal ch39 ($\lambda 39$=1543.87 nm) passes through an EDFA, the gain at $\lambda 39$ and its adjacent wavelength region is decreased as illustrated in FIG. 2D. Note that "hole" in spectrums corresponds to a state where gain is lower than that in other wavelength regions.

Figure 3A:
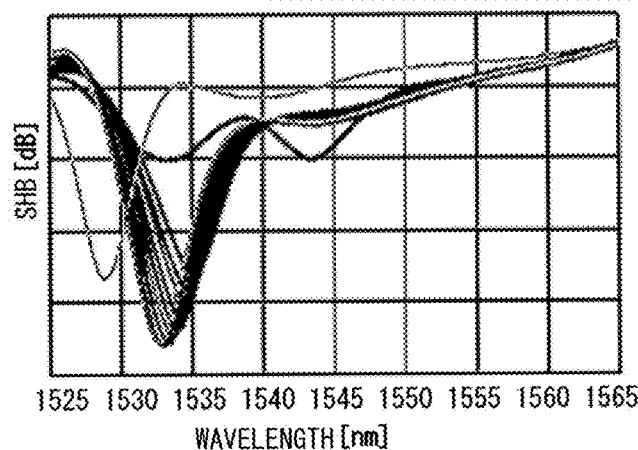
Figure 3B:
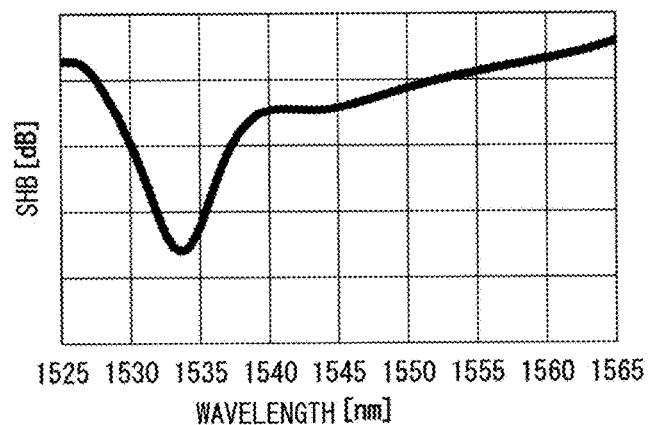

Spectral hole burning occurring when a plurality of optical signals pass through an EDFA can approximately be represented by the weighted average of the spectral hole burning of each of the optical signals. The weight of a weighted average depends upon the power of each optical signal. In other words, the weight of an optical signal with a high power is large while the weight of an optical signal with a low power is small. FIG. 3A illustrates characteristics of the spectral hole burning occurring when optical signals ch1, ch11-ch19 and ch39 are transmitted. FIG. 3B illustrates the weighted average of the plurality of spectrums illustrated in FIG. 3A. As illustrated, when a plurality of optical signals are transmitted, "hole" is likely to be formed in a wavelength region (about 1530 nm-1540 nm) in which a plurality of optical signals (ch11-ch19) are densely allocated.

The EDFA provided in each node is controlled in for example AGC (Automatic Gain Control) mode. In AGC, the average gain is kept at a specified target value. In such a case, the pump power of the EDFA is controlled so that the ratio between the total optical power of a WDM optical signal input to the EDFA and the total optical power of the WDM optical signal output from that EDFA becomes closer to the target value.

Figure 3C:
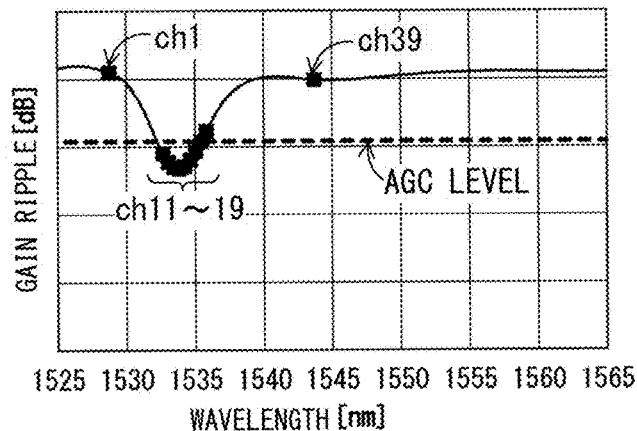

FIG. 3C illustrates the gain characteristics of an EDFA when optical signals ch1, ch11-ch19 and ch39 are transmitted. The dashed line represents the average gain maintained by the AGC. As illustrated in FIG. 3C, the wavelength region where the optical signal allocation is "dense" (i.e., the wavelength region where ch11-ch19 are allocated) has a gain that is lower than the average gain maintained by the AGC. The wavelength region where the optical signal allocation is "sparse" has a gain that is higher than the average gain maintained by the AGC. As described above, variation in gain caused by spectral hole burning (i.e., gain ripple) depends upon the wavelength allocation of a WDM optical signal. Specifically, a wavelength region with high power density tends to be caused by spectral hole burning to have a gain lower than the average gain and a wavelength region with low power density tends to be caused by spectral hole burning to have a gain higher than the average gain.

Variation in gain ripple caused by a change in the wavelength allocation of a WDM optical signal is discussed. A case is discussed as an example where optical signals ch11-ch19 are halted in a steady state in which optical signals ch1, ch11-ch19 and channel 39 are transmitted. Such a case occurs at the following situations in for example the optical transmission system illustrated in FIG. 1A.

(1) Transmitter Tx1 stops the transmission of optical signals ch11-ch19.
(2) The destinations of optical signals ch11-ch19 are changed.
(3) The optical fiber between nodes A and B is disconnected.

The spectral hole burning occurring after the halting of optical signals ch11-ch19 is represented approximately by the weighted average of the spectral hole burning of optical signal ch1 and spectral hole burning of optical signal ch39. FIG. 4A illustrates characteristics of spectral hole burning when only optical signals ch1 and ch39 are transmitted. FIG. 4B illustrates the weighted average of the spectrums illustrated in FIG. 4A.

When optical signals ch11-ch19 are halted in a steady state in which optical signals ch1, ch11-ch19 and ch39 are transmitted, the gain of the EDFA transits to the state illustrated in FIG. 4C from the state illustrated in FIG. 3C. At that moment, the gain for optical signals ch1 and ch39 remaining in the WDM optical signal changes greatly. In this simulation particularly, the gain for optical signal ch1 is decreased greatly. This results in large reduction of the power of optical signal ch1 immediately after the halting of optical signals ch11-ch19.

A change in the gain of an EDFA caused by a change in the wavelength allocation of a WDM optical signal occurs in each node. Also, when a WDM optical signal is transmitted via a plurality of nodes (i.e., when the transmission route of a WDM optical signal includes a plurality of OMSs (Optical Multiplex Sections), the gain variation occurring in each node is accumulated. This results in large variation, occurring immediately after a change in the wavelength allocation of the WDM optical signal, in the power of an optical signal remaining in the WDM optical signal that arrives at receiver Rx. Also, the power of the received optical signal gets out of the receivable power range of receiver Rx. In the example illustrated in FIG. 1C, the power of optical signal ch1 received by receiver Rx is lower than the minimum receivable level of receiver Rx.

The above problem is more likely to occur when the gain ripple is large in a steady state. In other words, if the gain ripple in a steady state is small, a change in optical gain wavelength characteristics caused by a change in the wavelength allocation of a WDM optical signal may be reduced. In view of this, an optical transmission device according to the present invention includes a function of reducing the gain ripple in a steady state. In other words, an optical transmission device according to the embodiments of the present invention has a function of flattening a gain with respect to a wavelength in a steady state.

Gain G of an EDFA is expressed by for example the following model, where λ represents a wavelength, z represents a position in an optical fiber, S represents gain of an EDFA when spectral hole burning is not taken into consideration, H represents a parameter that does not depend upon the optical power and gain, M represents a weight for weighted average, and $\lambda_j$ represents a wavelength of optical signal chj.

$$G(\lambda, z) = S(\lambda, z) - \frac{\frac{1}{\zeta}\sum_j [M(\lambda_j, z) \cdot \{S(\lambda_j, z) \cdot H(\lambda_j, \lambda)\}]}{1 + \frac{1}{\zeta}\sum_j [M(\lambda_j, z)]}$$

In this model, "$S(\lambda_j, z)H(\lambda_j, \lambda)$" represents the spectral hole burning caused by optical signal chj. Thus, when a plurality of optical signals are amplified by an EDFA, the gain of the EDFA can be obtained by calculating the weighted average by M for the spectral hole burning caused by each of the optical signals. Weight $M(\lambda_j, z)$ of optical signal chj depends upon the power of optical signal chj. Accordingly, when the power of optical signal chj changes, the spectrum of the gain of the EDFA also changes.

Figure 5:
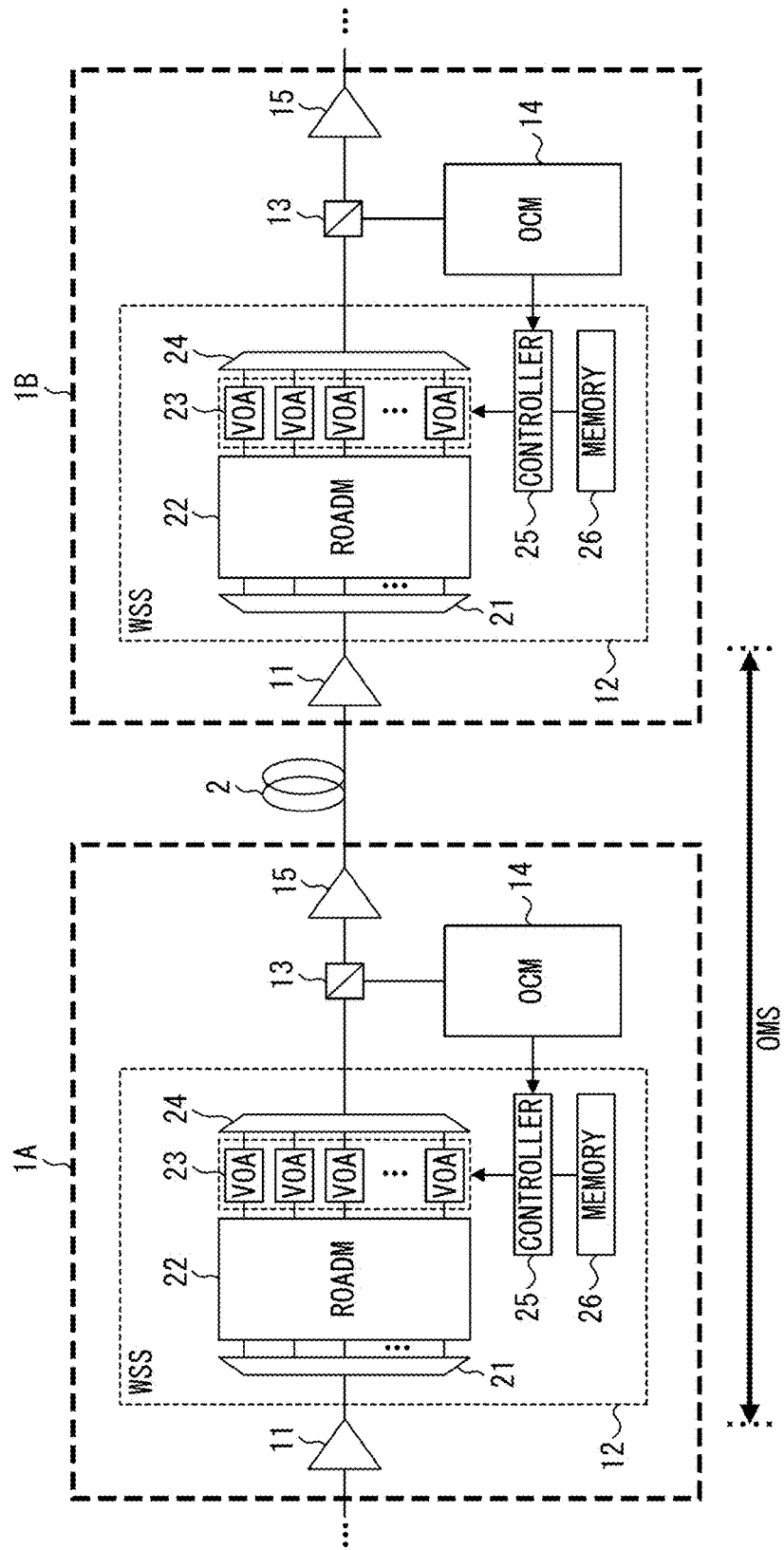
FIG. 5 illustrates an example of an optical transmission system.

FIG. 5 illustrates an example of an optical transmission system according to an embodiment of the present invention. Note that FIG. 5 illustrates a portion of the optical transmission system.

Each node of an optical transmission system is provided with an optical transmission device including an ROADM. Nodes are connected to each other via an optical fiber link. In other words, a WDM optical signal transmitted from the optical transmission device provided in one node is transmitted via an optical fiber link and is received by the optical transmission device provided in a next node. In the example illustrated in FIG. 5, the WDM optical signal transmitted from an optical transmission device 1A is transmitted via a transmission path fiber 2, and is received by an optical transmission device 1B. Note that it is assumed in the following description that optical transmission devices provided in the respective nodes have substantially similar configurations.

Each of the optical transmission devices 1 (1A and 1B) includes a pre-amplifier 11, a wavelength selective switch (WSS) 12, an optical splitter 13, an optical channel monitor (OCM) 14 and a post-amplifier 15. The pre-amplifier 11 amplifies a WDM optical signal received from another node. The pre-amplifier 11 amplifies a received WDM optical signal in AGC mode for example. The pre-amplifier 11 is implemented by an EDFA.

The wavelength selective switch 12 includes a wave demultiplexer 21, a ROADM 22, variable optical attenuators (VOAs) 23, a combiner 24, a controller 25 and a memory 26 so as to process a WDM optical signal amplified by the pre-amplifier 11. Note that the optical transmission device 1 may include a wavelength blocker instead of the wavelength selective switch 12.

The demultiplexer 21 separates a WDM optical signal amplified by the pre-amplifier 11 for wavelength. In other words, optical signals of respective wavelength channels are separated from each other. The ROADM 22 processes an optical signals of respective wavelength channels in accordance with path information. The path information is given by for example the user or the network administrator. For example, the ROADM 22 drops, from a WDM optical signal, an optical signal specified by the path information. The dropped optical signal is guided to for example a client. The ROADM 22 may add an optical signal to an unused wavelength channel. The added optical signal may be generated by a client. An optical signals output from the ROADM 22 are respectively guided to the variable optical attenuator 23.

The variable optical attenuator 23 can adjust the attenuation amount for each wavelength channel in a WDM optical signal. In a configuration in which a WDM transmission system transmits wavelength channels λ1-λ88 for example, the wavelength selective switch 12 may include eighty eight variable optical attenuators 23. The variable optical attenuator 23 adjusts the power of an optical signal in accordance with a control signal fed from the controller 25. This control signal specifies for example the attenuation amount. The combiner 24 multiplexes a plurality of optical signals output from the variable optical attenuator 23 so as to generate a WDM optical signal.

The controller 25 generates a control signal to control the variable optical attenuator 23. The controller 25 generates the control signal based on the optical power of each wavelength channel detected by the optical channel monitor 14 so that a WDM optical signal output from the wavelength selective switch 12 has a specified wavelength characteristic. As an example, the controller 25 generates the control signal that equalize the optical powers of a WDM optical signal output from the wavelength selective switch 12. Also, the controller 25 may correct the control signal based on the wavelength allocation of the WDM optical signal. When the control signal is corrected, the variable optical attenuator 23 adjusts the power of the optical signal in accordance with the corrected control signal.

In the memory 26, correction information for correcting the control signal is stored. The correction information is used for controlling a gain ripple caused by spectral hole burning, which will be described later in detail. Accordingly, the controller 25 can correct the control signal by referring to the correction information stored in the memory 26 when such correction is desirable.

The controller 25 executes for example a given program so as to provide a function of adjusting the power of each optical signal. In this case, the controller 25 is implemented by a processor. However, the controller 25 may include a hardware circuit. In other words, the function of adjusting the power of each optical signal may be implemented by a combination of a software process and a hardware circuit. A program executed by the processor may be stored in the memory 26.

The optical splitter 13 splits a WDM optical signal output from the wavelength selective switch 12, and guides a signal to the optical channel monitor 14. The optical splitter 13 may be implemented by an optical coupler. The optical channel monitor 14 detects the powers of respective optical signals multiplexed in a WDM optical signal output from the wavelength selective switch 12. In other words, the optical channel monitor 14 detects the optical power of each wavelength channel. OCM information, which represents the optical power of each wavelength channel, is fed to the controller 25.

The post-amplifier 15 amplifies a WDM optical signal output from the wavelength selective switch 12. In this example, the post-amplifier 15 amplifies a WDM optical signal in AGC mode. In AGC, the average gain of a WDM optical signal is kept at a specified target value. Note that the post-amplifier 15 is implemented by an EDFA.

In an optical transmission system employing the above configuration, operations related to the embodiments of the present invention are implemented in each optical transmission device. However, operations related to the embodiments of the present invention may be implemented by two optical transmission devices. In such a case, operations related to the embodiments of the present invention are implemented in an OMS including the wavelength selective switch 12, the optical channel monitor 14, the post-amplifier 15 in the optical transmission device on the transmission side and the pre-amplifier 11 in the optical transmission device on the reception side.

First Embodiment

FIG. 6 illustrates an example of an optical transmission device and an optical transmission system according to a first embodiment. According to the first embodiment, the optical transmission device 1 includes a wavelength allocation detector 31, a power density calculator 32, a correction value generator 33 and a power controller 34. The functions of the wavelength allocation detector 31, the power density calculator 32, the correction value generator 33 and the power controller 34 may be provided by the controller 25 illustrated in FIG. 5. When the controller 25 is implemented by a processor system, the functions of the wavelength allocation detector 31, the power density calculator 32, the correction value generator 33 and the power controller 34 are provided by a processor executing a control program.

Based on OCM information output from the optical channel monitor 14, the wavelength allocation detector 31 detects the wavelength allocation of a WDM optical signal output from the wavelength selective switch 12 (i.e., a WDM optical signal input to the post-amplifier 15). The optical channel monitor 14 detects the optical power of each wavelength channel of a WDM optical signal. Thus the wavelength allocation detector 31 identifies a wavelength channel in which a detected optical power is higher than a prescribed threshold level, and thereby detects the wavelength allocation of the WDM optical signal. In the example illustrated in FIG. 7A, wavelength channels ch1, ch11-ch19 and channel 39 have optical powers higher than the threshold level and the wavelength allocation detector 31 decides that optical signals ch1, ch11-ch19 and ch39 are multiplexed in the WDM optical signal. In the example illustrated in FIG. 7B, wavelength channels ch1 and ch39 have optical powers higher than the threshold level and the wavelength allocation detector 31 decides that optical signals ch1 and ch39 are multiplexed in the WDM optical signal.

Based on the wavelength allocation detected by the wavelength allocation detector 31, the power density calculator 32 calculates the power density with respect to a wavelength. Power density is calculated for each optical signal multiplexed in a WDM optical signal. Also, power density represents the density of optical signals that are allocated on the wavelength axis. Accordingly, power density may be expressed by the number of blank channels (i.e., the number of unused channels) existing up to the optical signal that is allocated the most closely. In such a case, in the example illustrated in FIG. 7A, the power density of each optical signal is as follows.

An optical signal that is allocated the most closely to optical signal ch1 is ch11. In this example, nine unused channels (ch2-ch10) exist between ch1 and ch11. Accordingly, the power density of optical signal ch1 is "9". Also, an optical signal that is allocated the most closely to optical signal ch11 is ch12. In this example, no unused channels exist between ch11 and ch12. Accordingly, the power density of optical signal ch11 is "0". In the example illustrated in FIG. 7A, therefore, the following values of power density are obtained for the respective optical signals multiplexed in the WDM optical signal.

ch1: 9
ch11-ch19: 0
ch39: 19

Similarly, in the example illustrated in FIG. 7B, the following values of power density are obtained for the respective optical signals multiplexed in the WDM optical signal.
ch1: 37
ch39: 37

Based on the power density of each optical signal, the correction value generator 33 generates a signal power correction value for each optical signal. In this example, the correction value generator 33 refers to a power density/correction value conversion table stored in a database 35 so as to obtain a signal power correction value for each optical signal. Note that the database 35 is configured by using for example the memory 26 illustrated in FIG. 5.

FIG. 8 illustrates an example of a power density/correction value conversion table. In this example, the power density/correction value conversion table stores an signal power correction value for the number of blank channels, which represents the power density. The power density/correction value conversion table is generated and stored in the database 35 in advance. Note that a signal power correction value is determined so that the power of an optical signal allocated in a wavelength region with low optical signal power density is increased relative to the power of an optical signal allocated in a wavelength region with high optical signal power density.

In the power density/correction value conversion table illustrated in FIG. 8, "correction value=0" represents that correction causes no changes in the power of the optical signal. "Correction value=3.5 dB" represents that the correction increases the power of the optical signal by 3.5 dB.

Note that the correspondence relationship between power density and a signal power correction value is determined in advance by conducting simulation or measurement. For example, a signal power correction value for power density is determined so that the amplitude of the gain ripple of an EDFA in a steady state is reduced (i.e., so that the gain is flattened with respect to a wavelength in a steady state). It is also possible to determine a signal power correction value for power density so that, when the wavelength allocation of a WDM optical signal changes, a change in the power of an optical signal remaining in the WDM optical signal is reduced.

In the example illustrated in FIG. 7A, the following signal power correction values are obtained for the respective optical signals multiplexed in the WDM optical signal.
ch1: +3.5 dB
ch11-ch19: 0 dB
ch39: +3.5 dB Also, in the example illustrated in FIG. 7B, the following signal power correction values are obtained for the respective optical signals multiplexed in the WDM optical signal.
ch1: +3.5 dB
ch39: +3.5 dB The power controller 34 generates a power control signal to control the variable optical attenuator 23 so that a WDM optical signal has a specified wavelength characteristic. In this example, the power controller 34 generates a power control signal to equalize a WDM optical signal output from the wavelength selective switch 12 (i.e., a WDM optical signal input to the post-amplifier 15). For this, the power controller 34 may generate power control signal to substantially equalize the powers of a plurality of optical signals multiplexed in the WDM optical signal by using the OCM information generated by the optical channel monitor 14. Note that the power control signal may include an instruction to adjust separately the power of each of a plurality of optical signals multiplexed in a WDM optical signal. This instruction may represent the attenuation amount for the corresponding variable optical attenuator 23.

Further, the power controller 34 corrects the power control signal based on the signal power correction values generated by the correction value generator 33. For example, the power controller 34 may add the signal power correction value generated by the correction value generator 33 to corresponding power control signal. However, when power control signals represent the attenuation amount for the variable optical attenuator 23, the power controller 34 may subtract the signal power correction value generated by the correction value generator 33 from corresponding power control signal.

In the example illustrated in FIG. 7A, it is assumed that the following attenuation values are calculated as power control signals in order to equalize the powers of optical signals ch1, ch11-ch19 and ch39.
ch1: 4.5 dB
ch11: 4.3 dB
ch12: 4.3 dB · · ·
ch19: 4.2 dB
ch39: 4.1 dB It is also assumed that the signal power correction values illustrated in FIG. 8 have been prepared. In this case, the attenuation amounts of the respective optical signals are corrected to the following values.
ch1: 1.0 dB (=4.5 dB–3.5 dB)
ch11: 4.3 dB (=4.3 dB–0 dB)
ch12: 4.3 dB (=4.3 dB–0 dB) · · ·
ch19: 4.2 dB (=4.2 dB–0 dB)
ch39: 0.6 dB (=4.1 dB–3.5 dB)

The power controller 34 gives a power control signal that has been corrected with the signal power correction value for each optical signal to corresponding variable optical attenuator 23. Then, the variable optical attenuator 23 adjusts the power of the optical signal in accordance with the corrected power control signal. In the above example, optical signal ch1 is attenuated by 1.0 dB and optical signal ch11 is attenuated by 4.3 dB. As described above, the attenuation amounts for the variable optical attenuator 23 are corrected so that the powers of optical signals ch1 and ch39 are increased relative to the powers of optical signals ch11 through ch19.

The combiner 24 of the wavelength selective switch multiplexes signals output from the variable optical attenuator 23 so as to generate a WDM optical signal. The post-amplifier 15 amplifies a WDM optical signal output from the wavelength selective switch 12. In this example, the post-amplifier 15 amplifies a WDM optical signal in AGC mode. In AGC, the average gain of a WDM optical signal is kept at a specified target value. Accordingly, in order to implement AGC, the optical transmission device 1 includes an AGC circuit 15a. The AGC circuit 15a controls the pump power of the post-amplifier 15 so that the ratio between the total optical power of an WDM optical signal input to the post-amplifier 15 and the total optical power of the WDM optical signal output from the post-amplifier 15 becomes closer to a target value.

FIG. 9 is a flowchart illustrating an example of a process of the controller 25. The process in this flowchart is executed when for example a change in the wavelength allocation of a WDM optical signal is detected. The wavelength allocation of a WDM optical signal changes for example when an optical signal is dropped from the WDM optical signal, when an optical signal multiplexed in the WDM optical signal is halted, and when an optical signal is added to the WDM optical signal. Note that the controller 25 can detect a change in the wavelength allocation of a WDM optical signal based on OCM information generated by the optical channel monitor 14. The optical channel monitor 14 continuously monitors the power of each optical signal in a WDM optical signal.

In S1, the controller 25 detects the power of each optical signal in a WDM optical signal based on OCM information generated by the optical channel monitor 14. In S2, the power controller 34 generates a power control signal to substantially equalize the powers of a plurality of optical signals based on the detected power of each optical signal in the WDM optical signal. A power control signal may represent the attenuation amount for each optical signal.

In S3, the wavelength allocation detector 31 detects the wavelength allocation of the WDM optical signal based on the power of each optical signal. In S4, the power density calculator 32 calculates the power density in the wavelength direction based on the wavelength allocation of the WDM optical signal detected by the wavelength allocation detector 31. The power density is calculated for each optical signal. In this example, the power density is expressed by a spacing to a next optical signal. Although the spacing to a next optical signal is expressed by the number of blank channels in the above example, it can be expressed by other parameters. For example, the spacing to a next optical signal may be expressed by a wavelength difference or a frequency difference. In S5, the correction value generator 33 generates, based on the power density of each optical signal, corresponding signal power correction value.

In S6, the power controller 34 corrects the power control signal generated in S2 with the signal power correction value generated in S5. Then, in S7, the controller 25 gives the corrected power control signal to the variable optical attenuator 23.

Next, effects of the embodiments of the present invention will be described by referring to FIGS. 10A-13. Specifically, effects of correcting the power control signal in accordance with the wavelength allocation of a WDM optical signal will be described.

It is assumed hereinafter that the wavelength allocation of a WDM optical signal changes from the steady state illustrated in FIG. 7A to the transition state illustrated in FIG. 7B. Specifically, the WDM optical signal transits from a state where optical signals ch1, ch11-ch19 and ch39 are transmitted to a state where only optical signals ch1 and ch39 are transmitted. Note that in FIG. 10B, FIG. 10C, FIG. 11B and FIG. 11C, "11 waves" represents a steady state in which optical signals ch1, ch11-ch19 and ch39 are transmitted, while "2 waves" represents a transition state in which only optical signals ch1 and ch39 are transmitted.

Figure 10A:
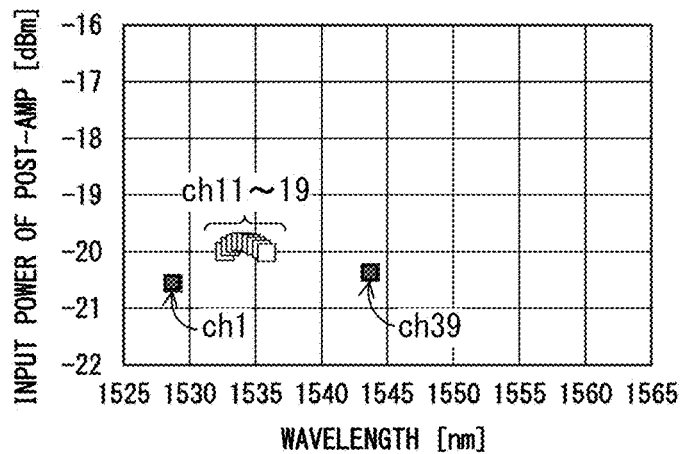
FIG. 10A through FIG. 10C illustrate states and gain ripples of a WDM optical signal when correction is not conducted.
Figure 10B:
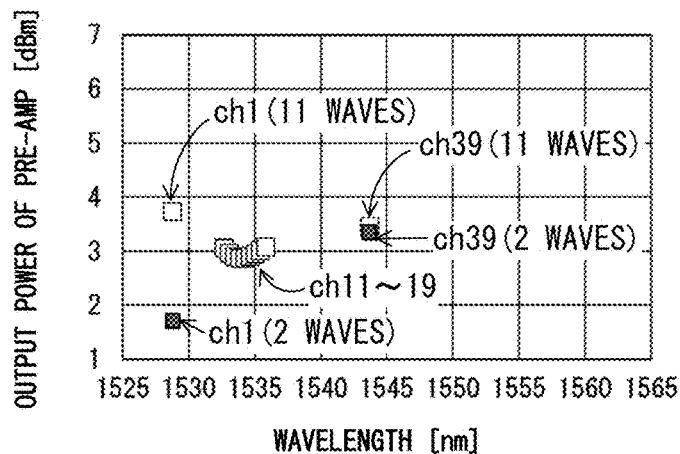
Figure 10C:
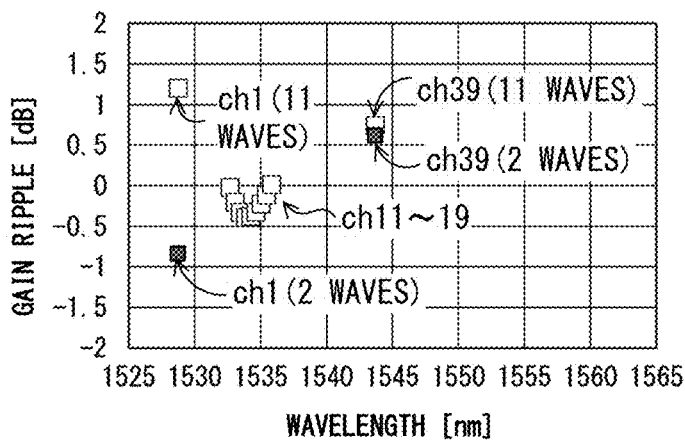

First, by referring to FIGS. 10A-10C, states and gain ripple of a WDM optical signal in a case when correction corresponding to the wavelength allocation of the WDM optical signal is not conducted are described. FIG. 10A illustrates the optical power input to the post-amplifier 15. The powers of optical signals input to the post-amplifier 15 are controlled in accordance with power control signals generated by the power controller 34. Optical powers input to the post-amplifier 15 are roughly identical to each other between the steady state and the transition state. However, optical signals ch11-ch19 do not exist in the transition state.

FIG. 10B illustrates the optical power output from the pre-amplifier 11 provided at the next node. Specifically, FIG. 10B illustrates a state after optical signals illustrated in FIG. 10A have been amplified by the post-amplifier 15 of the local node and by the pre-amplifier 11 of the next node. Also in FIG. 10B, optical signals ch11-ch19 do not exist in the transition state.

The optical powers of optical signals ch1 and ch39 are different between the steady state and the transition state. Specifically, when optical signals ch11-ch19 are halted in the steady state, the output optical powers of optical signals ch1 and ch39 decrease. Especially, the optical power of optical signal ch1 decreases greatly when optical signals ch11-ch19 are halted. This is due to a change in the gain ripple of an EDFA caused by a change in the wavelength allocation of the WDM optical signal.

FIG. 10C illustrates changes in gain ripples in one OMS. An OMS includes the post-amplifier 15 of a local node and the pre-amplifier 11 of the next node as illustrated in FIG. 5. When optical signals ch11-ch19 are halted in a steady state, the gain of the EDFA changes from the state illustrated in FIG. 3C to the state illustrated in FIG. 4C. As a result of this, the gain of optical signal ch1 has decreased by about 2.0 dB and the gain of optical signal ch39 has decreased by about 0.2 dB in this example. In such a case, there is a possibility that halting of optical signals ch11-ch19 leads to a temporary decrease in the optical power of optical signal ch1 by about 2.0 dB and to a temporary decrease in the optical power of optical signal ch39 by about 0.2 dB.

Figure 11A:
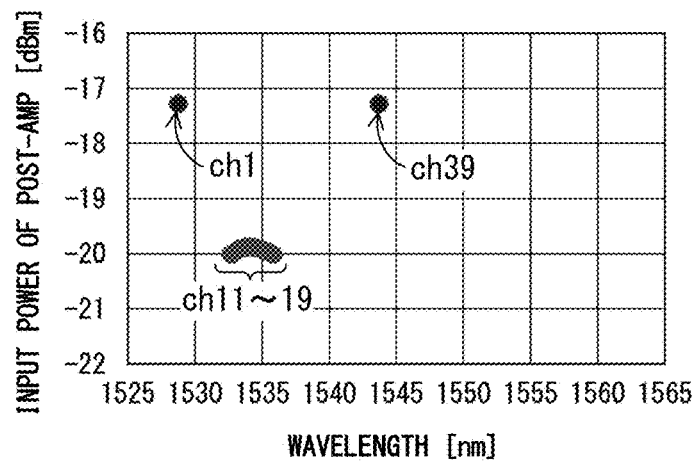
FIG. 11A through FIG. 11C illustrate states and gain ripples of a WDM optical signal when correction is conducted.
Figure 11B:
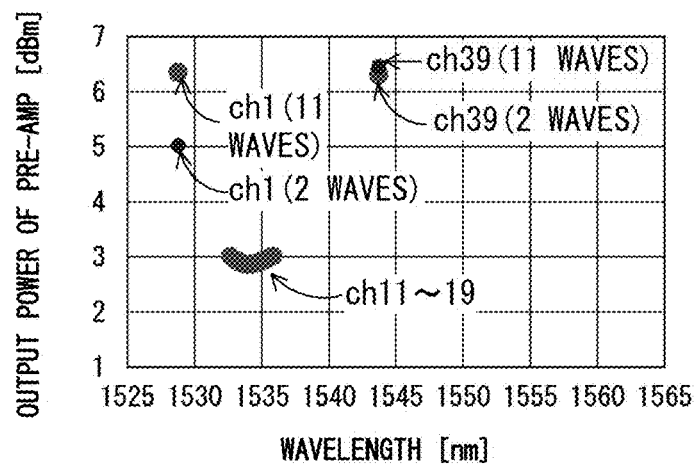
Figure 11C:
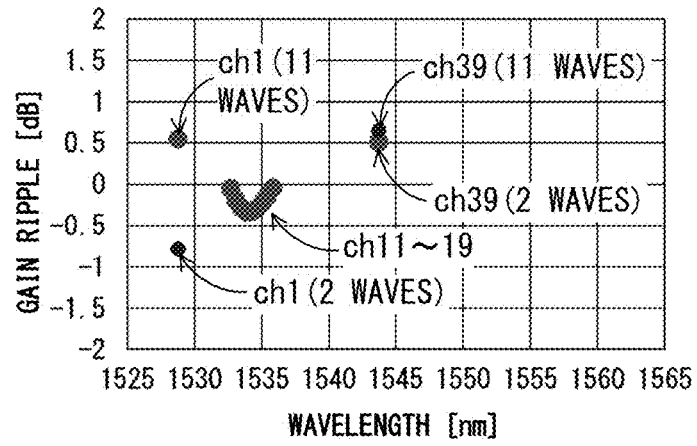

FIGS. 11A-11C illustrate states and gain ripples of a WDM optical signal in a case when the correction according to the first embodiment is conducted. Explanations will be given for a steady state in which optical signals ch1, ch11-ch19 and ch39 are allocated and a transition state in which only optical signals ch1 and ch39 are allocated similarly to the cases illustrated in FIGS. 10A-10C.

FIG. 11A illustrates the optical power input to the post-amplifier 15. In the first embodiment, a power control signal is corrected with a signal power correction value generated in accordance with power density. Specifically, a power control signal is corrected so that the power of an optical signal allocated in a wavelength region with low power density is increased relative to an optical signal allocated in a wavelength region with high power density. In this example, the power of each optical signal is corrected in accordance with the conversion table illustrated in FIG. 8. Specifically, a signal power correction value of 3.5 dB is generated for each of optical signals ch1 and ch39. Accordingly, compared with the state illustrated in FIG. 10A, the power of each of optical signals ch1 and ch39 in the steady state is controlled so that the correction makes each of them hither by 3.5 dB. On the other hand, a signal power correction value of zero is generated for each of optical signals ch11-ch19. Accordingly, the optical powers of optical signals ch11-ch19 in a steady state are substantially identical between FIG. 10A and FIG. 11A.

Figure 12:
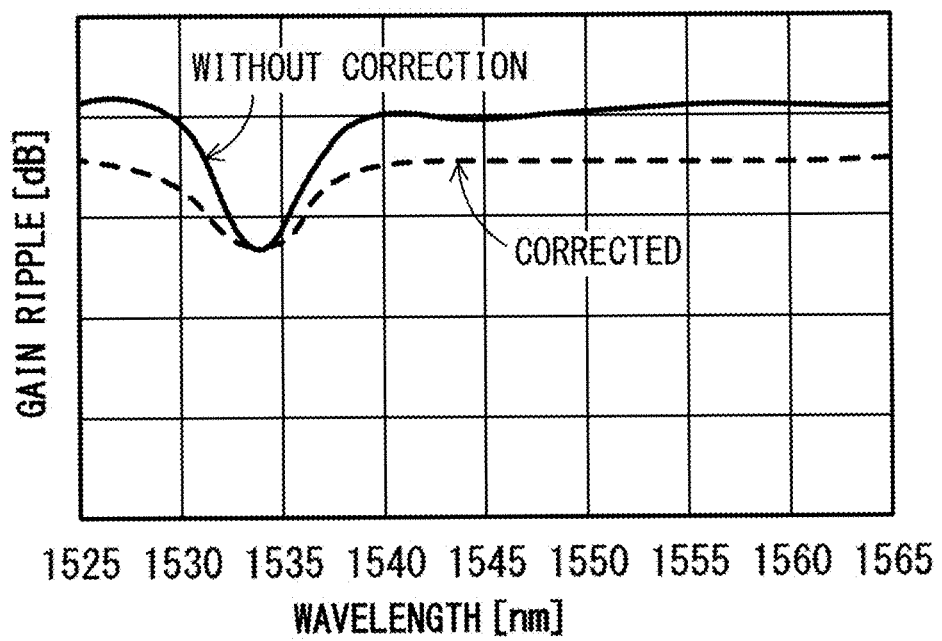
FIG. 12 illustrates flattening of gain levels.

An increase in the power of an optical signal deepens the "hole" of spectral hole burning. In other words, when the powers of optical signals ch1 and ch39 are increased by the correction of the power control signal, the gain in the wavelength regions around optical signals ch1 and ch39 are decreased. For example, the gain ripple of an EDFA in a case when the power control signal is not corrected is depicted by the solid line in FIG. 12. Note that the curve depicted by the solid line in FIG. 12 have the same gain characteristic as that depicted in FIGS. 4A-4C. By contrast, when the power control signal is corrected as described above, the gain in the wavelength regions in which optical signals ch1 and ch39 are allocated decreases relative to other wavelength regions. As a result of this, the amplitude of the gain ripple of the EDFA becomes smaller (or the "hole" becomes shallower)

as depicted by the dashed line in FIG. 12. In other words, the gain of an EDFA is flattened with respect to a wavelength by correcting the power control signal.

FIG. 11B illustrates the output optical power of the pre-amplifier 11 provided in the next node. As illustrated in FIG. 11B, even when a power control signal is corrected, the halting of optical signals ch11-ch19 decreases the output optical powers of optical signals ch1 and ch39. However, compared with a case where the power control signal is not corrected, changes in output optical powers of optical signals ch1 and ch39 caused by the halting of optical signals ch11-ch19 are smaller in a case where the power control signal is corrected. Specifically, in a case where power control signals are not corrected, the halting of optical signals ch11-ch19 decreases the power of optical signal ch1 by about 2.0 dB as illustrated in FIG. 10B. In a case where the power control signal is corrected, the halting of optical signals ch11-ch19 decreases the power of optical signal ch1 by about 1.3 dB as illustrated in FIG. 11B.

FIG. 11C illustrates changes in gain ripples in one OMS. In this example, the halting of optical signals ch11-ch19 in a steady state decrease the gain of optical signal ch1 by about 1.3 dB and decreases the gain of optical signal ch39 by about 0.2 dB. As described, when the power control signal is corrected, changes in gain ripples caused by a change in the wavelength allocation of a WDM optical signal are reduced compared with a case where the power control signal is not corrected.

Figure 13:
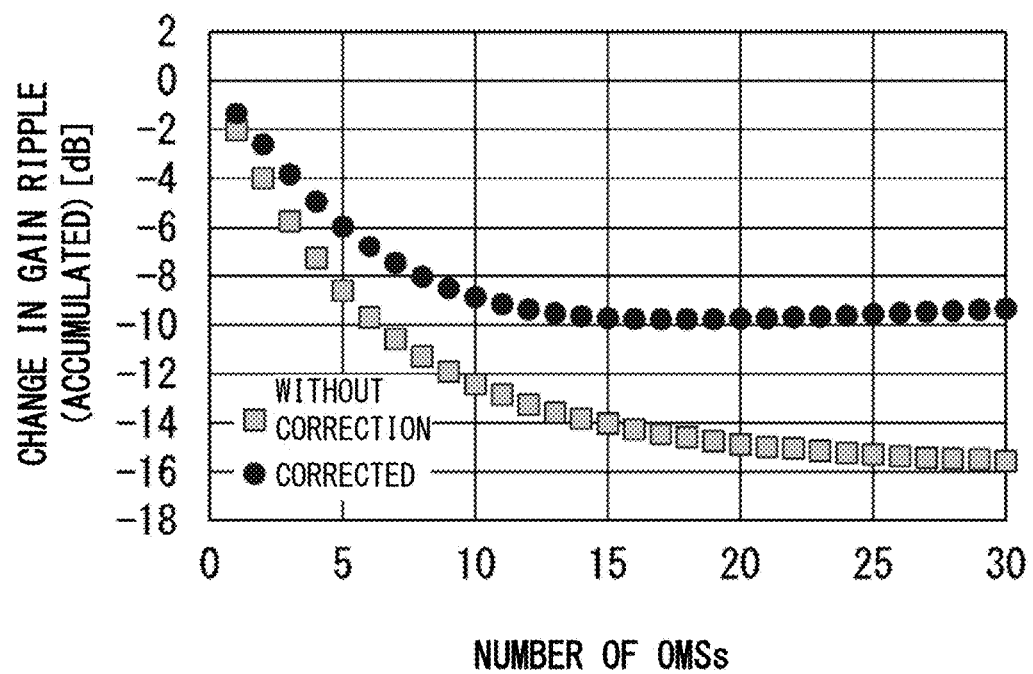
FIG. 13 illustrates effects of correction.

As described above, when the wavelength allocation of a WDM optical signal is changed, the gain ripple of an EDFA (the post-amplifier 15 of a local node and the pre-amplifier 11 of the next node in this example) is also changed. When a WDM optical signal is transmitted via a plurality of relay nodes, changes in gain ripple are accumulated. FIG. 13 illustrates changes in accumulated gain ripple for the number of relay nodes. In this example, as the number of relay nodes is increased, changes in the accumulated gain ripple are also increased. Note that the number of relay nodes corresponds to the number of OMSs through which the WDM optical signal passes.

As illustrated in FIG. 13, compared with an optical transmission system in which the power control signal is not corrected in each node, the changes in the accumulated gain ripple caused by a change in the wavelength allocation are reduced in an optical transmission system in which the power control signal is corrected in each node. Accordingly, in an optical transmission system in which the power control signal is corrected, the decrease in the powers of optical signals ch1 and ch39 (ch1 particularly) caused by the halting of optical signals ch11-ch19 is small.

It is assumed for example that the number of hop count of the WDM optical signal is 15. In such a case, when optical signals ch11-ch19 are halted in an optical transmission system in which the power control signal is not corrected, the power of optical signal ch1 at a receiving node decreases temporarily by about 14 dB. By contrast, in an optical transmission system in which the power control signal is corrected, when optical signals ch1-ch19 are halted, the power of optical signal ch1 at the receiving node decreases temporarily by about 10 dB. In other words, correction of the power control signal based on the wavelength allocation of a WDM optical signal improves the power of a received optical signal by 4 dB.

As described above, the first embodiment suppresses the amount of changes, caused by a change in the wavelength allocation of a WDM optical signal, in the power of an optical signal remaining in the WDM optical signal. Thus, signal errors in optical receivers may be suppressed.

Second Embodiment

FIG. 14 illustrates an example of an optical transmission system according to a second embodiment. In the second embodiment, the power of each optical signal multiplexed in a WDM optical signal is controlled based on the wavelength allocation of the WDM optical signal detected in the next node.

In the next node, the pre-amplifier 11 amplifies the WDM optical signal transmitted via the transmission path fiber 2. An optical splitter 41 splits the WDM optical signal amplified by the pre-amplifier 11, and guides the signal to an optical channel monitor (OCM) 42. The optical channel monitor 42 detects the power of each of the optical signals multiplexed in the WDM optical signal that was amplified by the pre-amplifier 11.

The wavelength allocation detector 31, the power density calculator 32, the correction value generator 33 and the database 35 are substantially similar between the first and second embodiments. However, the wavelength allocation detector 31 detects the wavelength allocation of a WDM optical signal amplified by the pre-amplifier 11 based on OCM information generated by the optical channel monitor 42. The power density calculator 32 calculates the power density with respect to a wavelength based on the wavelength allocation detected by the wavelength allocation detector 31. The correction value generator 33 generates a signal power correction value for each optical signal based on the power density of each optical signal. The correction value generator 33 may refer to the power density/correction value conversion table stored in the database 35 so as to obtain a signal power correction value for each optical signal. The functions of the wavelength allocation detector 31, the power density calculator 32 and the correction value generator 33 may be implemented by the controller 25 in the next node.

The controller 25 in the next node transmits the generated signal power correction value to an upstream node. The controller 25 also transmits the OCM information generated by the optical channel monitor 42 to the upstream node. The OCM information represents the power of each optical signal multiplexed in a WDM optical signal output from the pre-amplifier 11 of the next node.

The operations of the power controller 34 are substantially similar between the first and second embodiments. However, the power controller 34 of the second embodiment generates the power control signal to control the variable optical attenuator 23, based on the OCM information received from the next node. In this generation, the power controller 34 generates the power control signal to equalize the powers of optical signals multiplexed in the WDM optical signal output from the pre-amplifier 11 of the next node. Then, the power controller 34 corrects the generated power control signal by using the signal power correction values received from the next node.

Third Embodiment

Figure 15:
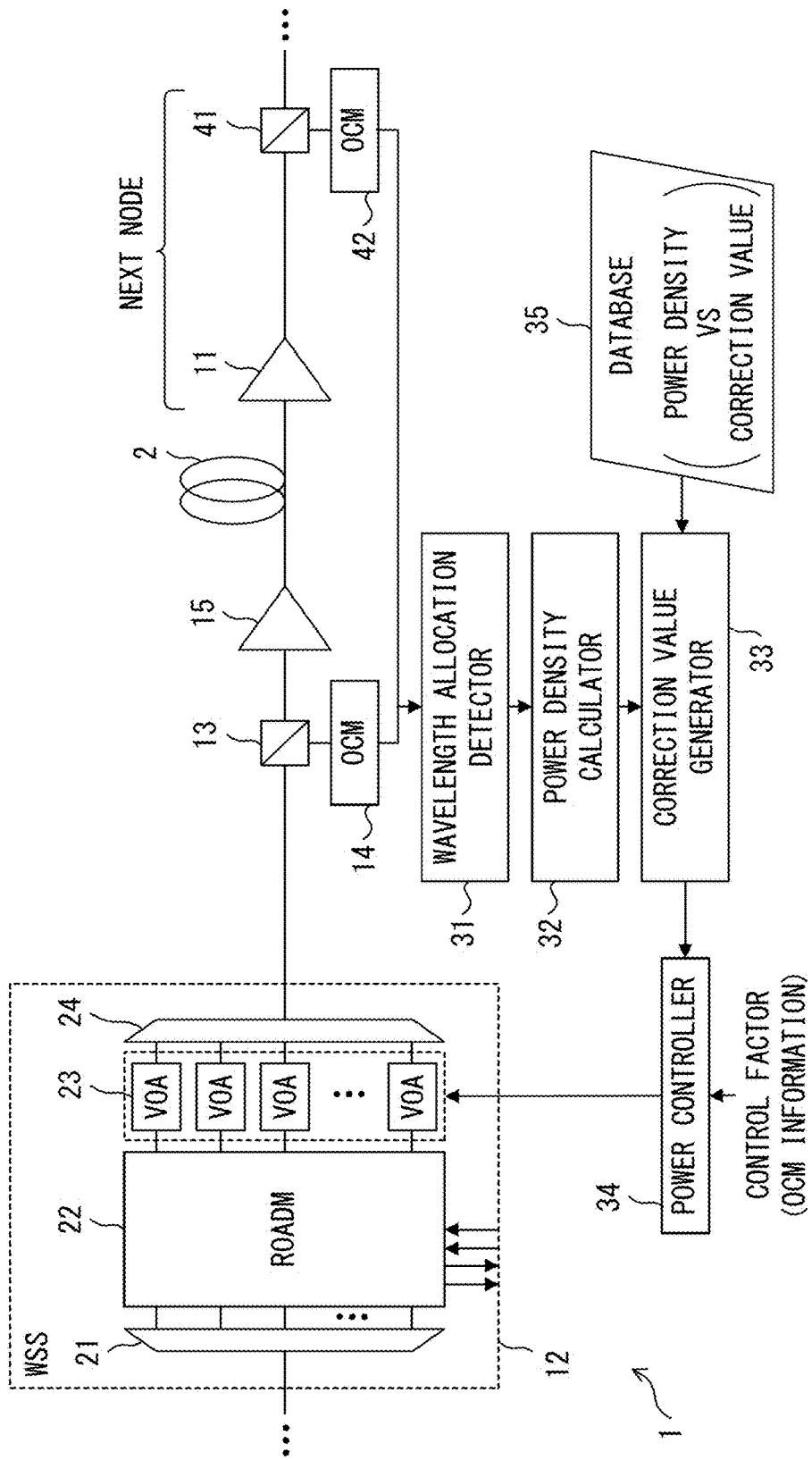
FIG. 15 illustrates an example of an optical transmission system according to a third embodiment.

FIG. 15 illustrates an example of an optical transmission system according to a third embodiment. The configuration of the third embodiment corresponds to a combination of the first and second embodiments. Specifically, in the third embodiment, first OMC information for a WDM optical signal input to the post-amplifier 15 of a local node is generated by using the optical channel monitor 14, and second OMC information for the WDM optical signal output from the pre-amplifier 11 of the next node is generated by using the optical channel monitor 42 of that next node. Then, by using one or both of the first OCM information and the second OCM information, the wavelength allocation of the WDM optical signal is detected and signal power correction values are generated. Note that, in the third embodiment, the optical transmission devices may be configured so that wavelength characteristics of a WDM optical signal output from the post-amplifier 15 of a local node is reversed with respect to wavelength characteristics of the WDM optical signal output from the pre-amplifier 11 of the next node.

Fourth Embodiment

Figure 16:
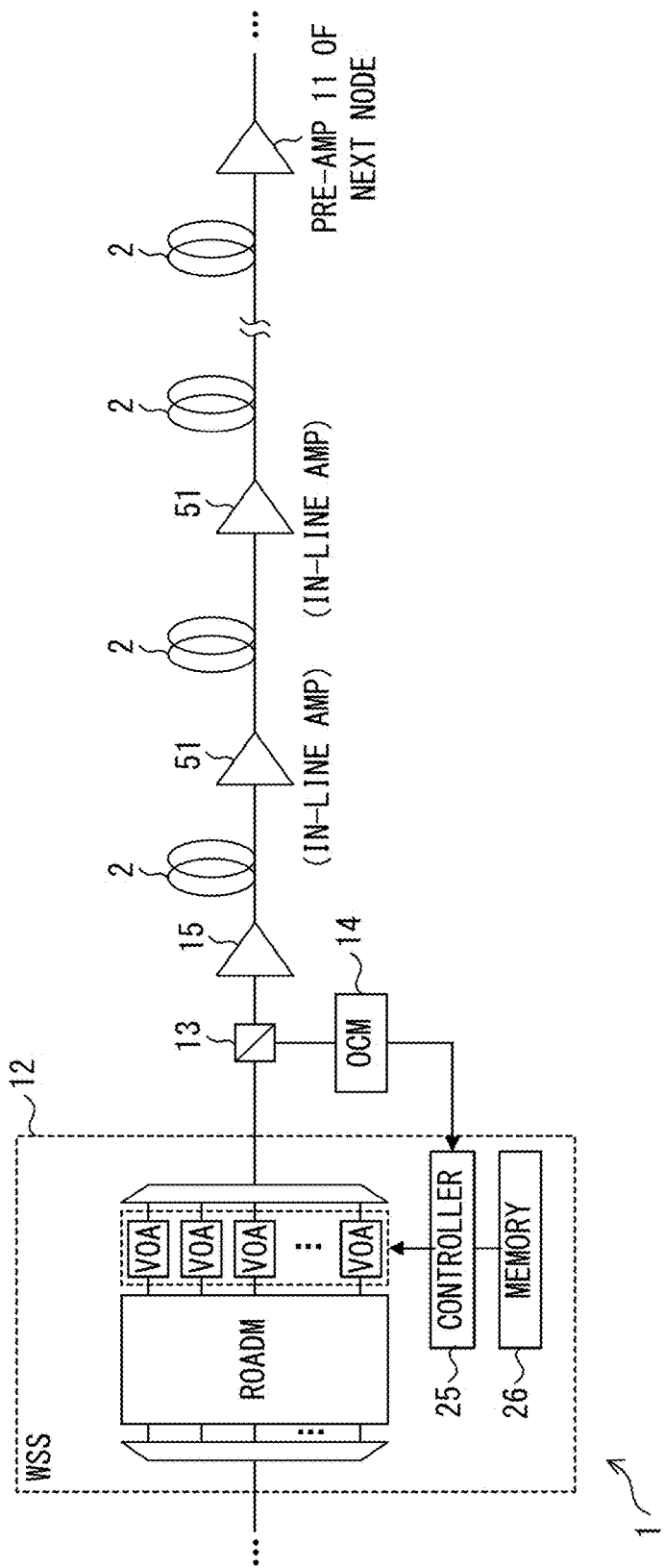
FIG. 16 illustrates an example of an optical transmission system according to a fourth embodiment.

FIG. 16 illustrates an example of an optical transmission system according to a fourth embodiment. In an optical transmission system according to the fourth embodiment, an in-line amplifier 51 is provided between nodes. In other words, a WDM optical signal output from the optical transmission device 1 is transmitted to the next node while being amplified by one or a plurality of the in-line amplifiers 51.

Fifth Embodiment

In the above embodiments, the optical transmission device (1A and 1B) that includes a ROADM is provided to a network node, whereas an optical transmission system according to the present invention is not limited this configuration. For example, some nodes in the optical transmission system may be provided with an optical transmission device not including a ROADM.

FIG. 17 illustrates an example of an optical transmission system according to the fifth embodiment. In the example illustrated in FIG. 17, an optical transmission device 3 that does not include a ROADM is provided between the optical transmission devices 1A and 1B. The optical transmission device 3 has a configuration similar to those of the optical transmission devices 1A and 1B. However, the optical transmission device 3 does not include the ROADM 22. Specifically, the optical transmission device 3 includes a wavelength blocker (WB) 61 instead of the wavelength selective switch (WSS) 22. The wavelength blocker 61 does not have a function of dropping or adding an optical signal, while it has a function of adjusting the power of each optical signal.

The operations of the optical transmission device 3 for adjusting the power of each optical signal in a WDM optical signal are substantially similar to those conducted by the optical transmission devices 1A and 1B. Specifically, in the optical transmission device 3, the optical channel monitor 14 detects the power of each optical signal in a WDM optical signal output from the wavelength blocker 61. Then, based on the monitoring result of the optical channel monitor 14, the controller 25 executes, among other processes, a process of generating a power control signal, a process of generating a signal power correction value, and a process of correcting the power control signal with the signal power correction value.

In the first through fourth embodiments, correction is conducted for each OMS (Optical Multiplex Section) in order to suppress the gain ripple. In other words, correction for suppressing gain ripple is conducted for each ROADM. According to the fifth embodiment by contrast, correction for suppressing gain ripple is conducted also in a section in which no ROADM is provided. In the example illustrated in FIG. 17, correction for suppressing the gain ripple may be conducted between the optical transmission device 1A and the optical transmission device 3 and between the optical transmission device 3 and the optical transmission device 1B.

OTHER EMBODIMENTS

As a method of generating a signal power correction value, many variations are possible. For example, it is possible to give "correction value=specified minimum value" to an optical signal allocated in a wavelength region with the highest power density, while giving "correction value=relative value with respect to the minimum value" to other optical signals. The minimum value may be 0 dB. In a case when the WDM optical signal illustrated in FIG. 7A is transmitted, optical signals ch11-ch19 are allocated in the wavelength region with the highest power density. In such a case, "correction value=0 dB" is given to optical signals ch11-ch19. To optical signals ch1 and ch39, a correction value that is greater than optical signals ch11-ch19 by 3.5 dB is given. Specifically, "correction value=3.5 dB" is given to optical signals ch1 and ch39.

A signal power correction value may be a negative value. When the signal power correction value is a negative value, control of reducing the powers of optical signals is conducted in this example. For example, it is assumed that "correction value=0 dB" is given to "number of blank channels=3" in the table illustrated in FIG. 8. In this case, "correction value=−1.5 dB" is given to "number of blank channels=1 or less" and "correction value=2.0 dB" is given to "number of blank channels=9 or more". Note that correction values may be limited to positive values.

When a power of an optical signal is too high, non-linear deterioration (self-phase modulation, cross-phase modulation, etc.) may occur in a transmission path fiber. When a power of an optical signal is too low, signal-to-noise ratio (SNR) may be decreased. Accordingly, signal power correction values may be determined between specified upper and lower limits. When for example the upper limit is 3 dB and the lower limit is −1 dB, the following correction values are generated for each optical signal in the WDM optical signal illustrated in FIG. 7A.

ch1: +3.0 dB
ch11-ch19: 0 dB
ch39: +3.0 dB

Each correction value may be determined so that the average of correction values given to respective optical signals becomes zero. When for example the upper limit is 3 dB, the lower limit is −1 dB, and the average of the correction values is zero, the following correction values are generated for the respective optical signals in the WDM optical signal illustrated in FIG. 7A.

ch1: +2.7 dB
ch11-ch19: −0.6 dB
ch39: +2.7 dB

In the above examples, the correction value generator 33 obtains a correction value corresponding to power density by using the table illustrated in FIG. 8, whereas the present invention is not limited to this configuration. Specifically, the correction value generator 33 may calculate a correction value based on power density. In such a case, coefficients etc. used for the calculation may be stored in the memory 26. The following formula may be used for calculating a correction value, where B represents the number of blank channels.

Correction value=5×log 10[(*B*+1)/2]

In the above examples, the power density corresponding to each optical signal is expressed by the spacing to the next optical signal, whereas the present invention is not limited to this method. For example, when calculation is conducted for the power density of one interested optical signal among optical signals in a WDM optical signal, it is possible to determine wavelength characteristic that works on the interested optical signal due to all the other optical signals in the WDM optical signal. In such a case, by conducting convolution integration of the signal wavelength allocation using the wavelength characteristic, the power density is calculated. The wavelength characteristic used for the convolution integration may be normal distribution (σ: about 2 nm) for the sake of convenience.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission system that includes a first optical transmission device and a second optical transmission device that receives a WDM (wavelength division multiplexed) optical signal transmitted from the first optical transmission device, the optical transmission system comprising:

a wavelength allocation detector that is implemented in the first optical transmission device or the second optical transmission device and configured to detect wavelength allocation indicating allocation of a plurality of optical signals multiplexed in the WDM optical signal;

a power adjusting unit that is implemented in the first optical transmission device and configured to adjust powers of the plurality of optical signals multiplexed in the WDM optical signal;

an optical amplifier that is implemented in the first optical transmission device and configured to amplify the WDM optical signal output from the power adjusting unit;

a power controller configured to generate a power control signal to control the power adjusting unit such that powers of the plurality of optical signals multiplexed in the WDM optical signal are substantially the same each other;

a correction value generator configured to generate a correction value to correct the power control signal based on the wavelength allocation; and a power density calculator configured to calculate, based on the wavelength allocation, power density in a wavelength range in which the plurality of optical signals multiplexed in the WDM optical signal are allocated, wherein the correction value generator generates a correction value that increases a power of an optical signal allocated in a wavelength range with low power density, relative to a power of an optical signal allocated in a wavelength range with high power density, the power controller corrects the power control signal with the correction value, and the power adjusting unit adjusts powers of the plurality of optical signals multiplexed in the WDM optical signal according to the corrected power control signal so as to make a power of an optical signal allocated in the wavelength range with low power density higher relative to a power of an optical signal allocated in the wavelength range with high power density.

2. The optical transmission system according to claim 1, wherein the power controller is implemented in the first optical transmission device, the wavelength allocation detector and the correction value generator are implemented in the second optical transmission device, and the power controller receives the correction value from the second optical transmission device and corrects the power control signal with the received correction value.

3. The optical transmission system according to claim 2, wherein the second optical transmission device includes an optical pre-amplifier that amplifies the WDM optical signal received from the first optical transmission device, and the wavelength allocation detector detects wavelength allocation of the WDM optical signal amplified by the optical pre-amplifier.

4. An optical transmission device comprising:

a wavelength allocation detector configured to detect wavelength allocation that indicates allocation of a plurality of optical signals multiplexed in a WDM (wavelength division multiplexed) optical signal;

a power adjusting unit configured to adjust powers of the plurality of optical signals multiplexed in the WDM optical signal;

an optical amplifier configured to amplify the WDM optical signal output from the power adjusting unit;

a power controller configured to generate a power control signal to control the power adjusting unit such that powers of the plurality of optical signals multiplexed in the WDM optical signal are substantially the same each other;

a correction value generator configured to generate a correction value to correct the power control signal based on the wavelength allocation; and a power density calculator configured to calculate, based on the wavelength allocation, power density in a wavelength range in which the plurality of optical signals multiplexed in the WDM optical signal are allocated, wherein the correction value generator generates a correction value that increases a power of an optical signal allocated in a wavelength range with low power density, relative to a power of an optical signal allocated in a wavelength range with high power density, the power controller corrects the power control signal with the correction value, and the power adjusting unit adjusts powers of the plurality of optical signals multiplexed in the WDM optical signal according to the corrected power control signal so as to make a power of an optical signal allocated in the wavelength range with low power density higher relative to a power of an optical signal allocated in the wavelength range with high power density.

5. The optical transmission device according to claim 4, wherein
 the power density calculator calculates the power density based on an spacing to a next optical signal for respective optical signals multiplexed in the WDM optical signal.

6. The optical transmission device according to claim 4, further comprising
 a memory configured to store information representing a correspondence between the power density and the correction value, wherein
 the power density calculator calculates power density for respective optical signals multiplexed in the WDM optical signal, and
 the correction value generator generates the correction value corresponding to the power density by referring to the information stored in the memory for respective optical signals multiplexed in the WDM optical signal.

* * * * *